(12) United States Patent
Gralde et al.

(10) Patent No.: US 11,613,175 B2
(45) Date of Patent: Mar. 28, 2023

(54) INDOOR SAFETY DEVICE, A LIQUEFIED FUEL GAS SYSTEM AND A VEHICLE

(71) Applicant: Scania CV AB, Södertälje (SE)

(72) Inventors: Marcus Gralde, Stockholm (SE); Mathias Jensen, Järna (SE); Linda Classon, Solna (SE)

(73) Assignee: Scania CV AB, Södertälje (SE)

( * ) Notice: Subject to any disclaimer, the term of this patent is extended or adjusted under 35 U.S.C. 154(b) by 99 days.

(21) Appl. No.: 16/767,629

(22) PCT Filed: Nov. 27, 2018

(86) PCT No.: PCT/SE2018/051219
§ 371 (c)(1),
(2) Date: May 28, 2020

(87) PCT Pub. No.: WO2019/112506
PCT Pub. Date: Jun. 13, 2019

(65) Prior Publication Data
US 2020/0369145 A1     Nov. 26, 2020

(30) Foreign Application Priority Data
Dec. 7, 2017  (SE) ................... 1751505-7

(51) Int. Cl.
*B60K 15/035* (2006.01)
*B60K 15/03* (2006.01)
(Continued)

(52) U.S. Cl.
CPC .. *B60K 15/03519* (2013.01); *B60K 15/03006* (2013.01); *F17C 13/04* (2013.01);
(Continued)

(58) Field of Classification Search
CPC ........ B60K 15/03519; B60K 15/03006; B60K 2015/03026; B60K 2015/03523;
(Continued)

(56) References Cited

U.S. PATENT DOCUMENTS 1,112,681 A * 10/1914 Crane ...................... F23J 11/02
104/52
1,679,705 A * 8/1928 Baumgartel .......... B08B 15/002
104/52
(Continued)

FOREIGN PATENT DOCUMENTS

DE   102012024714 A1   6/2014
DE   102015218986 A1   3/2017
(Continued)

OTHER PUBLICATIONS

Scania CV AB, International Application No. PCT/SE2018/051219, International Search Report, dated Jan. 29, 2019.
(Continued)

*Primary Examiner* — Jason K Niesz
(74) *Attorney, Agent, or Firm* — Moore & Van Allen PLLC; W. Kevin Ransom

(57) ABSTRACT

The invention relates to an indoor safety device for a liquefied fuel gas system, the system comprising a storage device storing liquefied fuel gas; a vent member arranged in fluid communication with the gas inside the storage device; and a safety valve arranged to evacuate gas when the pressure inside the storage device exceeds a predetermined first value, the safety device comprising: a vent coupling; a pressure relief valve arranged downstream of the vent coupling; and a conduit for conveying gas, adapted to be connected to the pressure relief valve, the safety device being removably connected to the system by connecting the vent coupling to the vent member, wherein the pressure relief valve is configured to release gas when the pressure
(Continued)

inside the storage device exceeds a predetermined second value, lower than the first value.

12 Claims, 3 Drawing Sheets

(51) Int. Cl.
*F17C 13/04* (2006.01)
*F17C 13/12* (2006.01)

(52) U.S. Cl.
CPC .. *F17C 13/123* (2013.01); *B60K 2015/03026* (2013.01); *B60K 2015/03523* (2013.01); *F17C 2205/037* (2013.01); *F17C 2205/0332* (2013.01); *F17C 2221/033* (2013.01); *F17C 2223/0161* (2013.01); *F17C 2223/033* (2013.01); *F17C 2227/0355* (2013.01); *F17C 2260/042* (2013.01); *F17C 2265/03* (2013.01); *F17C 2270/0171* (2013.01)

(58) Field of Classification Search
CPC ........... B60K 2015/03585; B60K 2015/03013; B60K 15/035; F17C 13/04; F17C 13/123; F17C 2205/0332; F17C 2205/037; F17C 2221/033; F17C 2223/0161; F17C 2223/033; F17C 2227/0355; F17C 2260/042; F17C 2265/03; F17C 2270/0171; F17C 2223/035; F17C 2227/0107; F17C 2250/0626; F17C 2260/035; F17C 2270/0173; F17C 2270/0176; F17C 2270/0178; F17C 2270/0168; F17C 9/02; F17C 13/00
USPC ........................................................ 137/512
See application file for complete search history.

(56) References Cited

U.S. PATENT DOCUMENTS

| | | | | |
|---|---|---|---|---|
| 2,993,344 | A * | 7/1961 | Reed | F17C 7/02 62/49.1 |
| 4,723,573 | A * | 2/1988 | Burnett | F17C 13/123 137/587 |
| 5,626,170 | A * | 5/1997 | Parker | F01M 11/0458 134/166 R |
| 6,196,280 | B1 | 3/2001 | Tate et al. | |
| 2004/0040304 | A1* | 3/2004 | Wolff | F02C 1/02 60/671 |
| 2005/0056338 | A1* | 3/2005 | Hertzler | F17C 13/04 141/2 |
| 2008/0297362 | A1* | 12/2008 | Veenstra | F17C 13/025 340/632 |
| 2009/0075135 | A1* | 3/2009 | Nonobe | H01M 8/04201 429/411 |
| 2010/0078244 | A1* | 4/2010 | Pursifull | B60K 15/07 180/69.5 |
| 2013/0263609 | A1 | 10/2013 | Mackey | |
| 2014/0158224 | A1* | 6/2014 | Brown | B61C 17/02 137/345 |
| 2015/0112506 | A1 | 4/2015 | Hanlin et al. | |
| 2015/0330575 | A1 | 11/2015 | Epstein et al. | |
| 2016/0040796 | A1* | 2/2016 | Omesti | F16K 17/383 137/68.23 |
| 2017/0030524 | A1 | 2/2017 | Tilander | |
| 2017/0144535 | A1* | 5/2017 | Sinderegger | B60K 15/035 |
| 2018/0304740 | A1* | 10/2018 | Sonderegger | F02M 37/0082 |
| 2018/0312235 | A1* | 11/2018 | Xu | B63B 25/16 |
| 2020/0385068 | A1* | 12/2020 | Szoucsek | B62D 25/10 |

FOREIGN PATENT DOCUMENTS

| | | |
|---|---|---|
| EP | 0745499 A2 | 12/1996 |
| JP | 2006349133 A | 12/2006 |
| JP | 2016133194 A | 7/2016 |
| WO | 2010151118 A1 | 12/2010 |
| WO | 2017188881 A1 | 11/2017 |

OTHER PUBLICATIONS

Scania CV AB, International Application No. PCT/SE2018/051219, Written Opinion, dated Jan. 29, 2019.
Scania CV AB, Swedish Application No. 1751505-7, Final Notice, dated Jun. 15, 2018.
Gunnarsson, L., et al., How to Handle Boil-off Gases from LNG Trucks, Jun. 4, 2015, pp. 41, 100 pages.
Scania CV AB, International Application No. PCT/SE2018/051219, International Preliminary Report on Patentability, dated Jun. 9, 2020.
Scania CV AB, European Patent Application No. 18885160.4, Extended European Search Report, dated Sep. 1, 2021.
Scania CV AB, Brazilian Patent Application No. BR112020009784-5, Preliminary Office Action, dated Sep. 27, 2022.

* cited by examiner

INDOOR SAFETY DEVICE, A LIQUEFIED FUEL GAS SYSTEM AND A VEHICLE

CROSS-REFERENCE TO RELATED APPLICATIONS

This application is a national stage application (filed under 35 § U.S.C. 371) of PCT/SE2018/051219, filed Nov. 27, 2018 of the same title, which, in turn, claims priority to Swedish Application No 1751505-7 filed Dec. 7, 2017; the contents of each of which are hereby incorporated by reference.

FIELD OF THE INVENTION

The present invention relates to an indoor safety device for a liquefied fuel gas system, a liquefied fuel gas system comprising such a safety device, a vehicle comprising such a liquefied fuel gas system.

BACKGROUND OF THE INVENTION

Today, alternative fuels, such as natural gas and biogas, are being introduced for propelling vehicles. One example of such a natural gas is liquefied natural gas, LNG, which is a common two-phase fuel gas stored in a liquid phase and a gaseous phase in a cryogenic gas tank. By transforming the gas into its liquid phase, an increase in density is achieved. However, for transforming the gas into its liquid phase usually quite low temperatures are needed. The temperatures which are needed to keep the gas in its liquid phase are often below −110 degrees Celsius. Over time, the warmer ambient temperature will increase the temperature in the gas tank and LNG in liquid phase will evaporate into gaseous phase. The pressure inside the gas tank will thereby increase. The gas created due to the increased temperature may be called boil-off gas. If the pressure becomes too high, the gas tank may be damaged. At least one safety valve is therefore typically arranged at the gas tank. The at least one safety valve is arranged to open when the pressure in the gas tank exceeds a certain pressure value and thereby release boil-off gas to the atmosphere. Due to current regulations the safety valve is typically connected to a pipe arrangement extending to a high point at the vehicle cab, where the gas is discharged.

Today, it is not recommended to release boil-off gas in indoor environments. Thus, when a vehicle is inside a building, for example in a garage or a workshop, and there is a risk that the at least one safety valve will release boil-off gas, a solution for preventing the boil-off gas from being released inside the building is desired. Today, one solution is to connect a hose to the pipe arrangement, through which hose the boil-off gas is conveyed to the outside. However, the pipe arrangement may comprise holes to ensure that water does not freeze and block the pipe arrangement, and due to the pressure drop in the hose it is therefore more likely that a significant amount of boil-off gas will be released through the holes in the pipe arrangement. Another solution is mentioned in document JP2016133194 A where the boil-off gas is collected in a collection receptacle instead of being evacuated into the atmosphere.

SUMMARY OF THE INVENTION

Despite known solutions in the field, it would be desirable to develop a way of releasing boil-off gas from a storage device storing liquefied fuel gas, which overcomes or at least alleviates the drawbacks mentioned above.

Hence, an object of the present invention is to achieve a new and advantageous indoor safety device, which prevents boil-off gas from being released in an indoor environment in a less complex, easier and more cost-efficient way.

Hence, according to an aspect of the invention an indoor safety device for a liquefied fuel gas system is provided. The system comprises at least one storage device storing liquefied fuel gas; at least one safety valve arranged to evacuate gas from the storage device when the pressure inside the storage device exceeds a predetermined first value; and a vent member arranged in fluid communication with the gas inside the storage device. The indoor safety device comprises: a vent coupling; a pressure relief valve adapted to be arranged downstream of the vent coupling; and a conduit for conveying gas, adapted to be connected to the pressure relief valve, wherein the indoor safety device is adapted to be removably connected to the liquefied fuel gas system by connecting the vent coupling to the vent member of the liquefied fuel gas system, wherein the pressure relief valve is configured to open when the pressure inside the storage device exceeds a predetermined second value, wherein the second value is lower than the first value.

The indoor safety device is suitably adapted to be used in a liquefied fuel gas system of a vehicle. The liquefied fuel gas may thus be adapted to drive a gas engine. The indoor safety device will therefore herein be described as associated with a vehicle but it is to be understood that the indoor safety device may be used on a stationary liquefied fuel gas system or similar.

It is commonly known that a liquefied fuel gas is stored in a liquid phase and a gaseous phase in a storage device. The liquefied fuel gas is suitably stored under pressure in the storage device and the temperature is suitably between −160 to −110 degrees Celsius. The liquefied fuel gas, which is stored in the gas storage device, may be liquefied natural gas, LNG. The LNG in liquid phase is suitably occupying a lower part of the storage device and the LNG in gaseous phase is suitably occupying an upper part of the storage device. Over time, the warmer ambient temperature will increase the temperature in the storage device and the additional energy will vaporize LNG in the liquid phase into gaseous phase. The gas created by the additional energy may be referred to as boil-off gas. The at least one safety valve is adapted to evacuate boil-off gas when the pressure inside the storage device exceeds a predetermined first value. However, as mentioned before, it is not suitable to evacuate boil-off gas in indoor environments due to the LNG being a flammable inert gas. Thus, when a vehicle comprising the liquefied fuel gas system is indoors, for example in a garage, a workshop, a ferry or similar, it should be ensured that no boil-off gas is evacuated indoors. By the indoor safety device according to the invention, boil-off gas will be released via the vent member of the liquefied fuel gas system instead of via the at least one safety valve. Thus, by configuring the pressure relief valve of the indoor safety device, such that it opens and releases boil-off gas at a pressure value lower than the pressure value opening the at least one safety valve, the boil-off gas can be conveyed to the outdoors by means of the conduit and safety is ensured.

Liquefied fuel gas systems typically comprise a vent member to allow venting of the storage device when refueling the storage device. Fuel stations thus typically comprise a type of vent coupling adapted to connect with the vent member of the liquefied fuel gas system. The vent member and the vent coupling will be further described below.

According to an embodiment of the invention the conduit is configured to convey the released gas to an outdoor environment. The conduit may be adapted to be mounted directly on the pressure relief device at one end and the conduit is further adapted to be positioned, such that the other end of the conduit discharges the boil-off gas outdoors. Prior art solutions where a garden hose is attached to a pipe arrangement (also called boil-off pipe) are cumbersome since the hose is fitted on the pipe arrangement at a high point of the vehicle cab. Furthermore, a significant amount of boil-off gas may very likely be evacuated through the drainage holes of the pipe arrangement and thus not be released outdoors. The indoor safety device being connected to a vent member of the liquefied fuel gas system overcomes these drawbacks and makes the process easier since mounting of the conduit no longer involves any climbing to high mounting points.

The conduit for conveying gas may comprise a flexible hose. The flexible hose may be a cryogenic hose or a simple garden hose. Alternatively or additionally, the conduit comprises a pipe or tube.

According to an embodiment of the invention the predetermined second value is between 14-15.5 bar. During operation of the gas engine, and thus the liquefied fuel gas system, the pressure inside the storage device is typically around 10 bar. When the temperature of the liquefied fuel gas increases and the creation of boil-off gas results in increased pressure the at least one safety valve is adapted to evacuate the boil-off gas before the pressure damages the storage device. The maximum working pressure in a liquefied fuel gas system may be 16 bar. Typically, liquefied fuel gas systems comprise at least one safety valve adapted to release boil-off gas when the pressure inside the storage device is slightly below the working pressure. The predetermined first value may thus be within the range of 15.8-16 bar. The liquefied fuel gas system may thus comprise a primary safety valve adapted to open at about 16 bar and a secondary safety valve adapted to open at about 24 bar in case the primary safety valve is malfunctioning. By configuring the pressure relief valve of the indoor safety device, such that it opens and releases gas at a pressure between 14-15.5 bar, it is ensured that the boil-off gas is released via the indoor safety device instead of via the safety valve(s).

According to an embodiment of the invention the vent coupling comprises a female quick disconnect valve, adapted to be connected to the vent member of the liquefied fuel gas system. Suitably, the vent coupling is configured, such that gas from the storage device can be released via the indoor safety device when the vent coupling is connected to the vent member. The vent coupling may be adapted to form a bayonet coupling together with the vent member of the liquefied fuel gas system.

According to an embodiment of the invention the indoor safety device further comprises a restrictor adapted to be arranged downstream of the vent coupling. If a vehicle comprising the liquefied fuel gas system is entering a workshop and the pressure inside the storage device is higher than the predetermined second value, connecting the indoor safety device may result in a large amount of cold (−110° C.) boil-off gas being released via the pressure release device into the conduit. The cold gas may thus affect the conduit, such that it cracks. One way of solving this is to use a cryogenic conduit. Another way of solving this is to arrange a restrictor downstream of the vent coupling. The restrictor is thus adapted to restrict the flow of gas, such that the gas does not cause problems for the material of the conduit. This way, a simple garden hose may be used as a conduit.

The restrictor is suitably adapted to be arranged downstream of the vent coupling and upstream of the pressure relief valve. Alternatively, the restrictor is adapted to be arranged downstream of the pressure release valve, wherein the conduit is attached to the restrictor. The conduit may thus be connected to the pressure relief valve via the restrictor. The restrictor may comprise a channel with a very small diameter, through which the boil-off gas is passing. The restrictor suitably comprises a channel having a diameter considerably smaller than the diameter of the vent coupling and considerably smaller than the diameter of the conduit.

According to an embodiment of the invention the pressure relief valve is configured to allow manual opening of the valve. Pressure relief valves allowing manual opening of the valve are commonly known and typically comprises a manoeuvring element for manually opening the valve. By using such a pressure relief valve in the indoor safety device, an operator can manually open the pressure relief valve when the indoor safety device is connected to the vent member, and thereby determine if gas is released from the storage device or not.

According to an aspect of the invention a liquefied fuel gas system is provided. The system comprises: at least one storage device storing liquefied fuel gas; at least one safety valve arranged to evacuate gas from the storage device when the pressure inside the storage device exceeds a predetermined first value; and a vent member arranged in fluid communication with the gas inside the storage device. The system further comprises an indoor safety device as described herein. The system thus comprises an indoor safety device including a vent coupling; a pressure relief valve adapted to be arranged downstream of the vent coupling; and a conduit for conveying gas, adapted to be connected to the pressure relief valve, wherein the indoor safety device is adapted to be removably connected to the liquefied fuel gas system by connecting the vent coupling to the vent member, wherein the pressure relief valve is configured to release gas when the pressure inside the storage device exceeds a predetermined second value, wherein the second value is lower than the first value. The liquefied fuel gas system is suitably adapted to be arranged on a vehicle comprising a gas engine.

The vent member may comprise a male quick disconnect valve, which requires connection to a vent coupling for opening the valve. As previously mentioned liquefied fuel gas systems typically comprise a vent member allowing venting of at least one storage device for example during refueling. The vent member is arranged in fluid communication with the liquefied fuel gas in gaseous phase but is normally in a closed position, such that no gas is released via the vent member. A male quick disconnect valve may also be called a male quick disconnect vent. The vent member may thus comprise a spring loaded valve. In order to open the vent member a vent coupling must be connected to the vent member, whereby the vent member opens and gas can be released from the storage device. The vent coupling of the indoor safety device is suitably a female quick disconnect valve/vent adapted to be connected to the vent member. The vent member may comprise guide pins and the vent coupling may comprise grooves adapted to interact with the pins of the vent member, such that the vent coupling easily is accurately positioned. Thus, the vent member and the vent coupling may together form a bayonet coupling. When the vent coupling, and thus the indoor safety device, is connected to the vent member, boil-off gas can be released from the storage device via the vent member into the vent coupling and on to the pressure relief valve. If the pressure of the gas exceeds the predetermined second value, the pressure relief valve opens and the boil-off gas is released to the conduit and on to the outdoor environment.

The vent coupling may be referred to as a vent nozzle and the vent member may be referred to as a vent receptacle.

The indoor safety device may be connected to the vent member only when the liquefied fuel gas system is in an indoor environment for a predetermined period of time. Thus, the indoor safety device is suitably only connected to the vent member when the liquefied fuel gas system is indoors and there is a risk that the ambient temperature will cause an increase of pressure, such that boil-off gas may be evacuated via the at least one safety valve. Since it may be difficult to predict how long a vehicle will be indoors and there is a risk that a malfunctioning safety valve opens at a lower pressure, the indoor safety device is suitably always connected to the vent member when the vehicle is indoors.

The system may further comprise a vent valve arranged upstream of the vent member, wherein the vent valve should be in an open position when the indoor safety device is used. The vent valve is suitably a screw down valve which normally is in a closed position. Thus, when the vehicle is operating the vent valve is closed and no gas inside the storage device can reach the vent member. This way, no gas will be released via the vent member even if the vent member leaks. Thus, even if the vent coupling is connected to the vent member no gas will be released through the vent member as long as the vent valve is closed. When the vehicle is not operating and is indoors, the indoor safety device is suitably connected to the vent member, the conduit connected to the pressure release valve is positioned in fluid communication with an outdoor environment and subsequently the vent valve is manually operated to an open position. This way, gas can reach the vent member and be released/evacuated via the indoor safety device. A marker of some sort may be attached to the vent valve in order to show that the vent valve is opened. This way, an operator is reminded to close the vent valve before disconnecting the indoor safety device. As previously mentioned the indoor safety device may comprise a pressure relief valve allowing manual opening. By manually opening the pressure relief valve when the indoor safety device has been connected to the vent member, it can be determined if the vent valve has been opened or not.

The terms downstream and upstream are herein defined as positions in relation to the flow of gas from the storage device. Thus, a first object being arranged upstream of a second object is arranged closer to the storage device than the second object.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
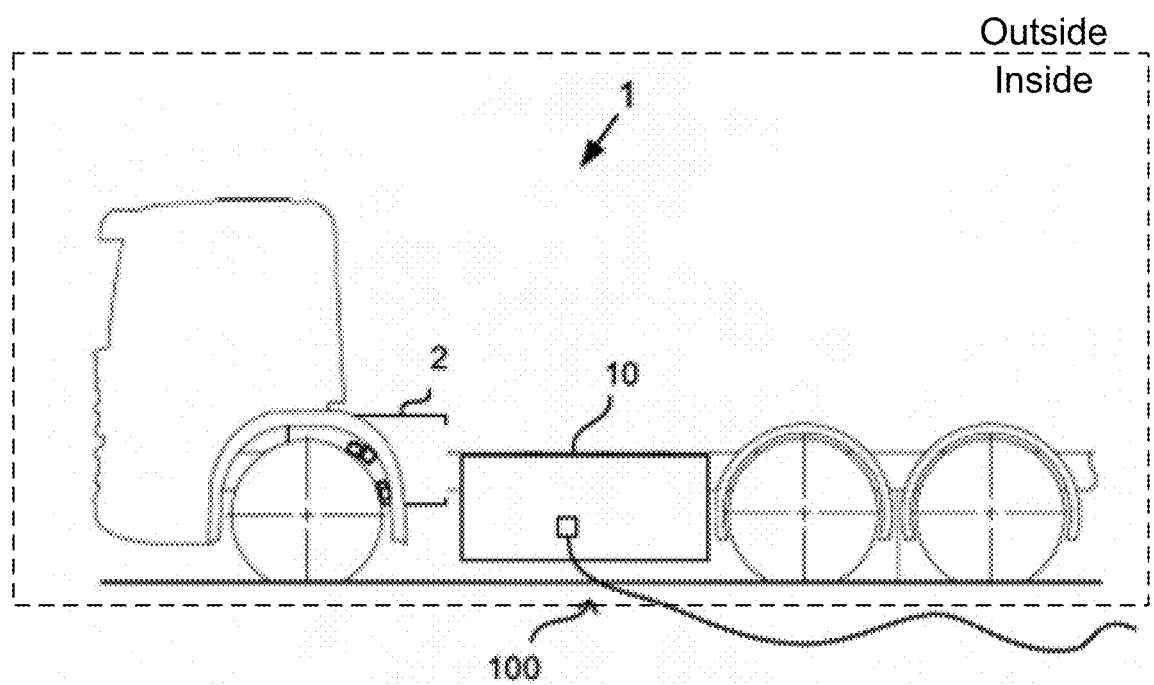
FIG. 1 schematically illustrates a vehicle according to an embodiment of the invention.

FIG. 1 schematically shows a side view of a vehicle 1 according to an embodiment of the invention. The vehicle 1 comprises a propulsion unit 2. The propulsion unit 2 is suitably a gas engine. The vehicle 1 may further comprise a liquefied fuel gas system 10 for supplying liquefied fuel gas to the gas engine 2. The liquefied fuel gas system 10 may comprise an indoor safety device 100. The liquefied fuel gas system 10 and the indoor safety device 100 are further described in FIG. 2 and FIG. 3. The vehicle 1 can be any kind of vehicle comprising a gas engine. Examples of vehicles comprising a gas engine are trucks, busses, boats, passenger cars, construction vehicles, and locomotives. The present invention can also be used in connection with any other platform than vehicles, as long as this platform comprises a gas engine. One example is a power plant with a gas engine.

In the following, the liquefied fuel gas system 10 will be described as it can be embodied when using it in a vehicle 1. As a consequence, not all components in the description are necessary. They are, however, added in the description for showing a preferred embodiment of the present disclosure.

Figure 2:
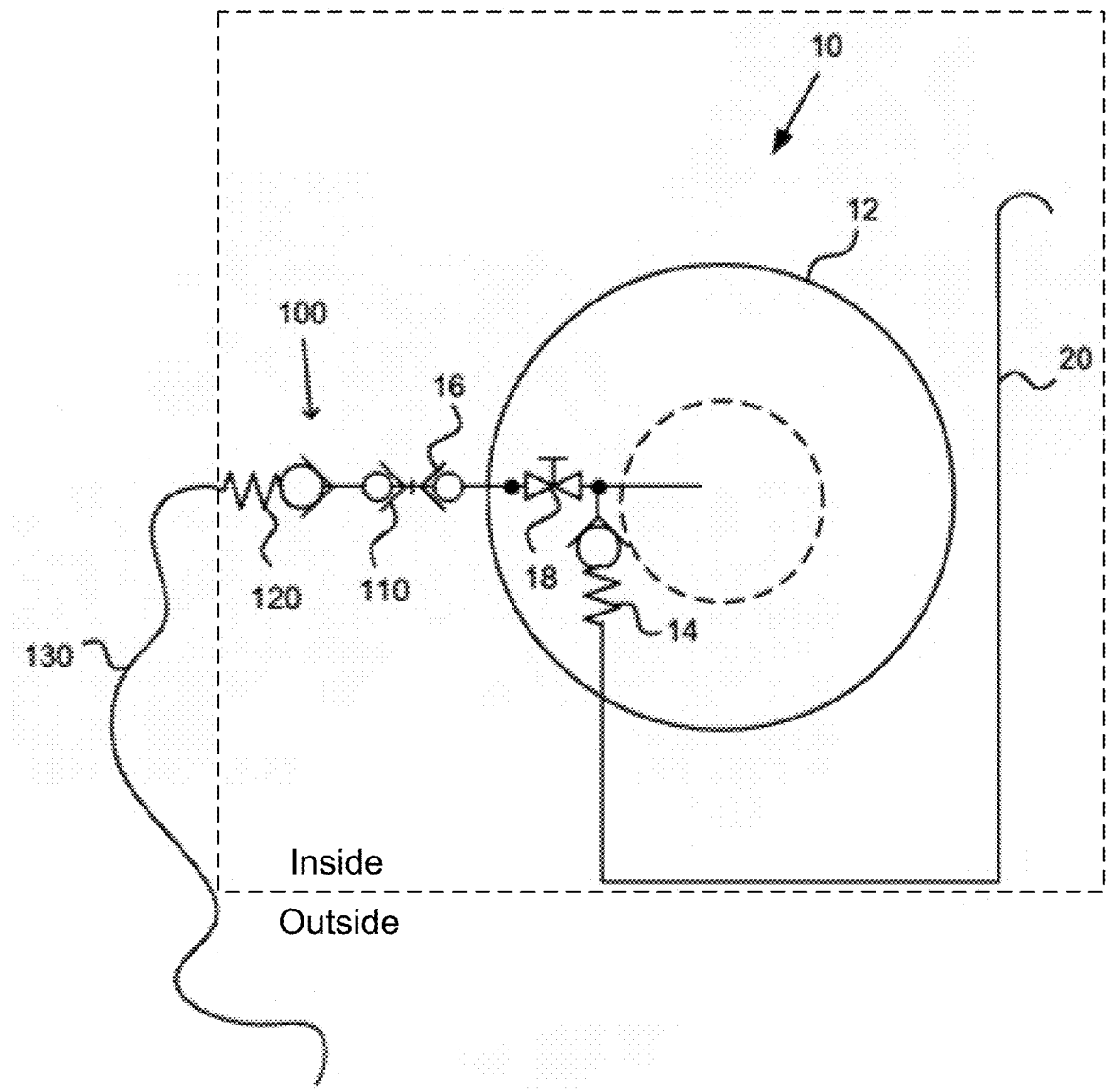
FIG. 2 schematically illustrates a liquefied fuel gas system according to an embodiment of the invention.

FIG. 2 schematically shows a liquefied fuel gas system 10 according to an embodiment of the invention. The system 10 comprises: at least one storage device 12 storing liquefied fuel gas; at least one safety valve 14 arranged to release gas from the storage device 12 when the pressure inside the storage device 12 exceeds a predetermined first value; and a vent member 16 arranged in fluid communication with the gas inside the storage device 12. The system 10 further comprises an indoor safety device 100. The indoor safety device 100 comprises a vent coupling 110; a pressure relief valve 120 adapted to be arranged downstream of the vent coupling 110; and a conduit 130 for conveying gas, adapted to be connected to the pressure relief valve 120. The indoor safety device 110 is adapted to be removably connected to the liquefied fuel gas system 10 by connecting the vent coupling 110 to the vent member 16, wherein the pressure relief valve 120 is configured to release gas when the pressure inside the storage device 12 exceeds a predetermined second value. The predetermined second value is lower than the predetermined first value.

The liquefied fuel gas system 10 is suitably adapted to be arranged on a vehicle 1 as disclosed in FIG. 1. The system 10 is thus suitably adapted to supply fuel gas to a gas engine as disclosed in FIG. 1. The liquefied fuel gas system 10 comprises at least one passage (not shown) for transporting the fuel gas from the storage device 12 to the gas engine.

The indoor safety device 100 is adapted to be connected to the vent member 16 only when the system 10/vehicle 1 is indoors. The conduit 130 of the indoor safety device 100 is configured to convey the released gas to an outdoor environment. By connecting the indoor safety device 100 to the vent member 16 gas from the storage device 12 will be released via the vent member 16 and the indoor safety device 100 to an outdoor environment instead of via the at least one safety valve 14.

The conduit 130 may be adapted to be mounted directly on the pressure relief device 120. The conduit 130 may comprise a flexible hose. The flexible hose may be a cryogenic hose or a simple garden hose. Alternatively or additionally, the conduit 130 comprises a pipe or tube.

The at least one safety valve 14 of the system 10 may be configured to open when the pressure inside the storage device 12 exceeds 15.8 bar. The system 10 may comprise a secondary safety valve (not shown) which is configured to open when the pressure inside the storage device 12 exceeds 24 bar. This way, it is ensured that gas will be released even if the at least one safety valve 14 malfunctions. The pressure relief valve 120 of the indoor safety device 100 may be configured to open when the pressure inside the storage device 12 exceeds 14 bar. The predetermined second value may be between 14-15.5 bar.

The vent coupling 110 of the indoor safety device 100 may comprise a female quick disconnect valve, adapted to be connected to the vent member 16 of the liquefied fuel gas system 10. The vent member 16 may comprise a male quick disconnect valve, which requires connection to the vent coupling 110 for opening the valve. The vent member 16 is arranged to allow venting of the storage device 12 for example during refueling. The vent member 16 is normally in a closed position, such that no gas can be released via the vent member 16. In order to open the vent member 16 a vent coupling, such as the vent coupling 110 of the indoor safety device 100, must be connected to the vent member 16, whereby the vent member 16 opens and gas can be released from the storage device 12. The vent member 16 may comprise guide pins and the vent coupling 110 may comprise grooves adapted to interact with the pins of the vent member 16, such that the vent coupling 110 easily is accurately positioned. Thus, the vent member 16 and the vent coupling 110 may together form a bayonet coupling. When the vent coupling 110, and thus the indoor safety device 100, is connected to the vent member 16, boil-off gas can be released from the storage device 12 via the vent member 16 into the vent coupling 110 and on to the pressure relief valve 120. If the pressure of the gas exceeds the predetermined second value, the pressure relief valve 120 opens and the boil-off gas is released to the conduit 130 and on to the outdoor environment.

The system 10 may further comprise a vent valve 18 arranged upstream of the vent member 16, wherein the vent valve 18 should be in an open position when the indoor safety device 100 is used. The vent valve 18 is suitably a screw down valve which normally is in a closed position. Thus, when the vehicle 1 is operating the vent valve 18 is closed and no gas inside the storage device 12 can reach the vent member 16. When the indoor safety device 100 is connected to the vent member 16 the vent valve 18 is suitably manually operated to an open position. This way, gas can reach the vent member 16 and be released via the indoor safety device 100.

The system 10 also comprises a pipe arrangement 20 arranged in fluid communication with the at least one safety valve 14. The pipe arrangement 20 may also be referred to as a "boil-off pipe" and is adapted to release boil-off gas from the storage device 12 when the safety valve 14 is open. The end of the pipe arrangement 20 through which the boil-off gas is discharged, is typically arranged at a high point on the vehicle 1. In this figure the liquefied fuel gas system 10 only comprises one storage device 12. It is, however, to be understood that the system 10 may comprise a plurality of storage devices 12. In such cases, all storage devices 12 are suitably connected to the same pipe arrangement 20.

The liquefied fuel gas which is stored in the storage device 12 may be liquefied natural gas, LNG. LNG is a common two-phase gas which can be used for propelling vehicles. LNG is usually stored below −110 degree Celsius in the storage device 12. The storage device 12 may be a cryogenic gas tank.

The system 10 may comprise a pressure regulator (not shown) arranged downstream of the storage device 12. The system 10 may further comprise a heat exchanger device (not shown) arranged downstream of the pressure regulator. The heat exchange device may use cooling water from the gas engine to heat the fuel gas coming from the pressure regulator. This assures that fuel gas drawn from the liquid phase in the storage device will be converted into its gaseous phase before reaching the gas engine. The heat exchanger device also ensures that the gas reaching the gas engine has a temperature that the gas engine can handle.

The system 10 may further comprise a gas regulator system (not shown) arranged downstream of the heat exchanger device. The gas engine has a preferred input gas pressure. This preferred input gas pressure may be supplied by the gas regulator system. In one example, the preferred input gas pressure is around 7 bar. The at least one passage may comprise a section arranged to transport fuel gas from the heat exchange system or the gas regulator system to the gas engine.

The system 10 may also comprise a so called pressure build up device (not shown), arranged to add energy to the system 10 in order to maintain a certain pressure. A pressure build up device may be arranged to transfer energy from outgoing heated fuel gas in gaseous phase to the fuel gas in liquid phase in the storage device 12, to increase the pressure in the storage device 12.

Figure 3:
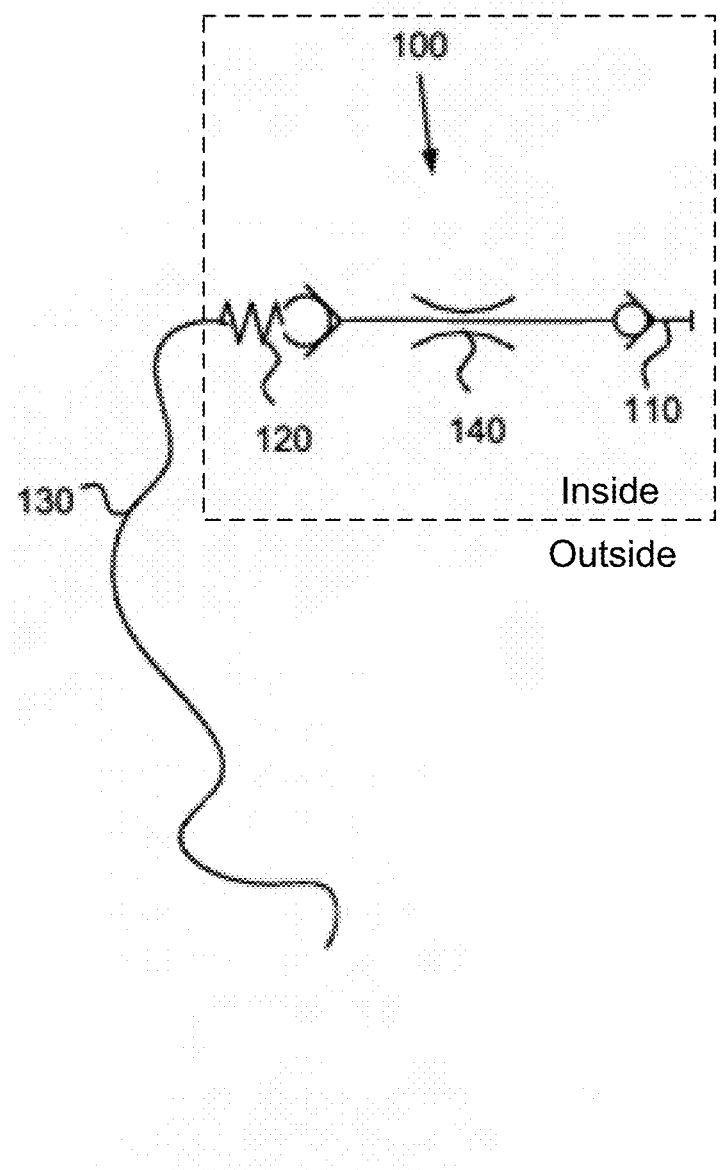
FIG. 3 schematically illustrates an indoor safety device according to an embodiment of the invention.

FIG. 3 schematically illustrates an indoor safety device 100 for a liquefied fuel gas system 10 according to an embodiment of the invention. The indoor safety device 100 is suitably configured as disclosed in FIG. 2 with the difference that it further comprises a restrictor 140 adapted to be arranged downstream of the vent coupling 110. The restrictor 140 is adapted to restrict the flow of gas from the storage device 12, such that the cold gas does not cause problems for the material of the conduit 130. This way, a simple garden hose may be used as a conduit 130. During short periods of time indoors the restrictor 140 also reduces the amount of fuel gas being released to the atmosphere. The indoor safety device thus reduces the impact on the environment and the amount of lost fuel.

The restrictor 140 is suitably adapted to be arranged downstream of the vent coupling 110 and upstream of the pressure relief valve 120 as disclosed in this figure. Alternatively, the restrictor 140 is adapted to be arranged downstream of the pressure release valve 130, in which case the conduit 130 is attached to the restrictor 140. The restrictor 140 may comprise a channel having a diameter considerably smaller than the diameter of the vent coupling 110.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. An indoor safety device for a liquefied fuel gas system, wherein the liquefied fuel gas system comprises: at least one storage device storing liquefied fuel gas; a vent member arranged in fluid communication with the gas inside the storage device; and at least one safety valve arranged to automatically release gas from the storage device independent of the vent member when the pressure inside the storage device exceeds a predetermined first pressure value, the indoor safety device comprising:
a vent coupling;
a pressure relief valve configured to be arranged downstream of the vent coupling; and
a conduit for conveying gas comprising an inlet configured to be connected to the pressure relief valve,
wherein the indoor safety device is configured to be removably connected to the liquefied fuel gas system by connecting the vent coupling to the vent member,
wherein the pressure relief valve is configured such that it opens when the pressure inside the storage device exceeds a predetermined second pressure value to thereby vent gas from inside the storage device via the vent member and through the conduit, and
wherein the predetermined second pressure value is lower than the predetermined first pressure value, such that the pressure relief valve is configured to relieve pressure from the storage device prior to the pressure in the storage device reaching the first pressure value where gas would be released via the at least one safety valve to thereby prevent unwanted release of gas from the at least one safety valve.

2. The indoor safety device according to claim 1, wherein the conduit is configured to convey the released gas to an outside environment.

3. The indoor safety device according to claim 1, wherein the conduit for conveying gas is a flexible hose.

4. The indoor safety device according to claim 1, wherein the predetermined second value is between 14-15.5 bar.

5. The indoor safety device according to claim 1, wherein the vent coupling comprises a female quick disconnect valve, configured to be connected to the vent member of the liquefied fuel gas system.

6. The indoor safety device according to claim 1, further comprising:
a restrictor configured to be arranged downstream of the vent coupling.

7. The indoor safety device according to claim 1, wherein the pressure relief valve is configured to allow manual opening of the valve.

8. A liquefied fuel gas system, comprising:
at least one storage device storing liquefied fuel gas;
a vent member arranged in fluid communication with the gas inside the storage device;
at least one safety valve arranged to automatically release gas from the storage device independent of the vent member when the pressure inside the storage device exceeds a predetermined first pressure value; and
an indoor safety device comprising:
a vent coupling;
a pressure relief valve configured to be arranged downstream of the vent coupling; and
a conduit for conveying gas comprising an inlet configured to be connected to the pressure relief valve,
wherein the indoor safety device is configured to be removably connected to the liquefied fuel gas system by connecting the vent coupling to the vent member,
wherein the pressure relief valve is configured such that it opens when the pressure inside the storage device exceeds a predetermined second pressure value to thereby vent gas from inside the storage device via the vent member and through the conduit, and
wherein the predetermined second pressure value is lower than the predetermined first pressure value, such that the pressure relief valve is configured to relieve pressure from the storage device prior to the pressure in the storage device reaching the first pressure value where gas would be released via the at least one safety valve to thereby prevent unwanted release of gas from the at least one safety valve.

9. The liquefied fuel gas system according to claim 8, wherein the vent member comprises a male quick disconnect valve, which requires connection to the vent coupling to open.

10. The liquefied fuel gas system according to claim 8, wherein the indoor safety device is connected to the storage device when the system is in an indoor environment.

11. The liquefied fuel gas system according to claim 8, further comprising:
a vent valve arranged upstream of the vent member,
wherein the vent valve is configured to be in an open position when the indoor safety device is used.

12. A vehicle comprising a liquefied fuel gas system comprising:
at least one storage device storing liquefied fuel gas;
a vent member arranged in fluid communication with the gas inside the storage device;
at least one safety valve arranged to automatically release gas from the storage device independent of the vent member when the pressure inside the storage device exceeds a predetermined first pressure value; and
an indoor safety device comprising:
a vent coupling;
a pressure relief valve configured to be arranged downstream of the vent coupling; and
a conduit for conveying gas comprising an inlet configured to be connected to the pressure relief valve,
wherein the indoor safety device is configured to be removably connected to the liquefied fuel gas system by connecting the vent coupling to the vent member,
wherein the pressure relief valve is configured such that it opens when the pressure inside the storage device exceeds a predetermined second pressure value to thereby vent gas from inside the storage device via the vent member and through the conduit, and
wherein the predetermined second pressure value is lower than the predetermined first pressure value, such that the pressure relief valve is configured to relieve pressure from the storage device prior to the pressure in the storage device reaching the first pressure value where gas would be released via the at least one safety valve to thereby prevent unwanted release of gas from the at least one safety valve.

* * * * *